F. STARIN.
BALL BEARING.
APPLICATION FILED JUNE 26, 1915.

1,192,470.

Patented July 25, 1916.
2 SHEETS—SHEET 1.

WITNESS
F. Rawe.

INVENTOR
F. Starin
BY
Sigmund Herzog
his ATTORNEY

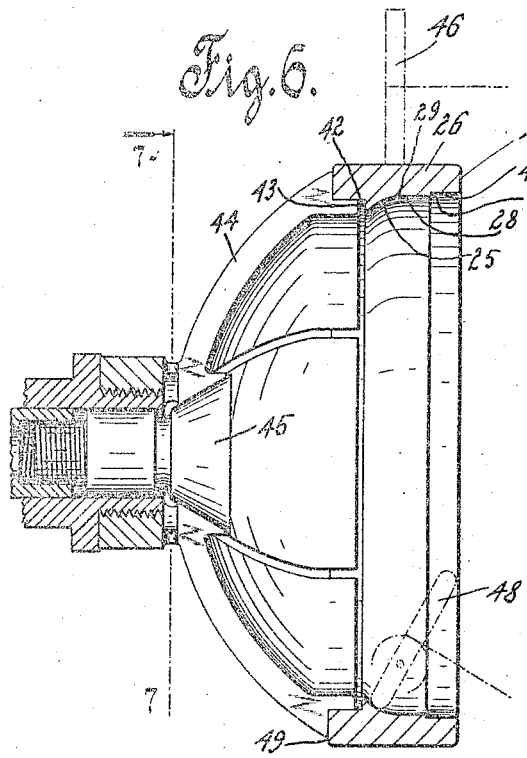
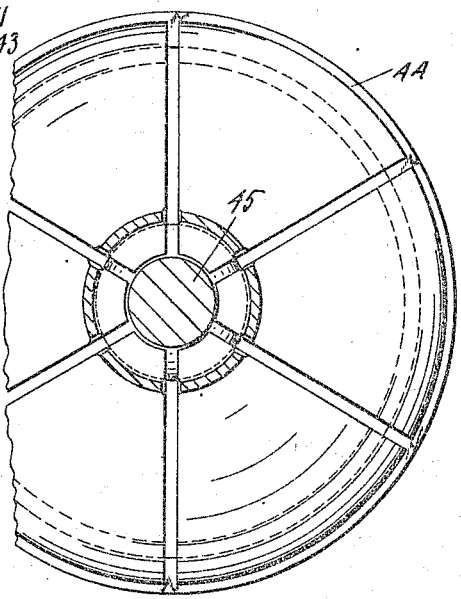
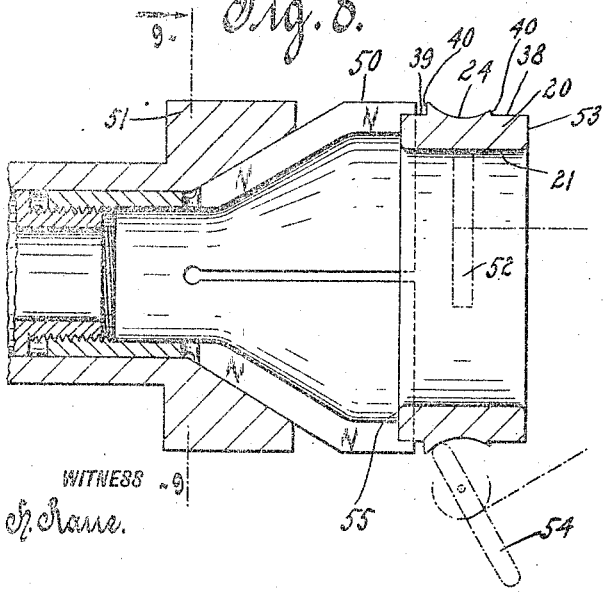
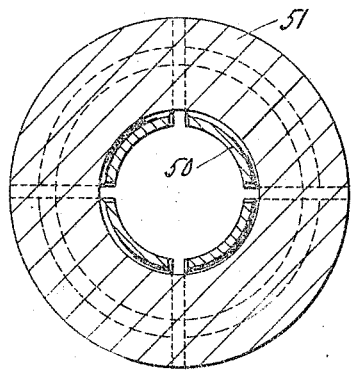

UNITED STATES PATENT OFFICE.

FRANK STARIN, OF SPRINGFIELD, MASSACHUSETTS.

BALL-BEARING.

1,192,470.

Specification of Letters Patent.

Patented July 25, 1916.

Application filed June 26, 1915. Serial No. 36,529.

*To all whom it may concern:*

Be it known that I, FRANK STARIN, a subject of the Emperor of Austria-Hungary, and a resident of the city of Springfield, in the county of Hampden and State of Massachusetts, have invented certain new and useful Improvements in Ball-Bearings, of which the following is a specification.

The present invention relates to ball bearings, and more particularly to that type in which the balls are spaced apart by suitably shaped separating means, the latter being carried by a common support so as to constitute with the balls retained and separated thereby an assembled unit. The retaining devices and their support will be termed hereinafter the "cage". Heretofore, as far as known, the balls were placed one at a time into the ball raceways, and the retaining members were assembled in the raceways with the support to form a cage. The assembling under the conditions stated takes considerable time, requires great skill and is very difficult in view of the fact that great care must be taken in order to insure a proper alinement of the coöperating parts.

One of the objects of the present invention is to provide a ball bearing, into the raceways of which an assembled cage with the balls therein may be conveniently inserted as a unit, thereby obviating the defects mentioned of the ball bearings heretofore in use.

Another object of the invention is to form the cage in such a manner that undue friction is prevented between the balls and the said cage.

A further object of the invention is to so construct the bearing rings that they can be conveniently finished, that is to say ground and polished, in two operations.

With these and other objects in view, which will more fully appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and details of construction within the scope of the appended claim without departing from the spirit or sacrificing any of the advantages of the invention.

One of the many possible embodiments of the invention is illustrated in the accompanying drawings, in which:—

Figure 1:
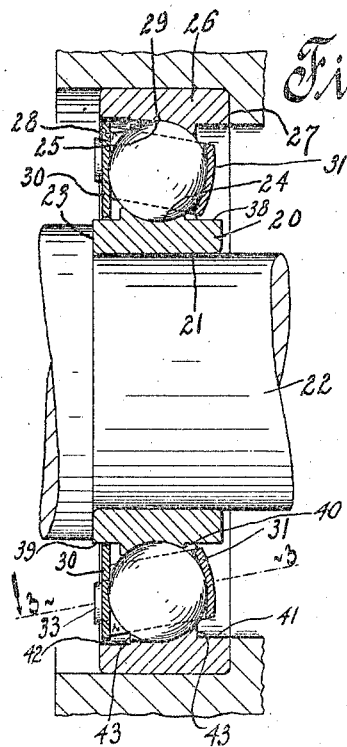
Figure 2:
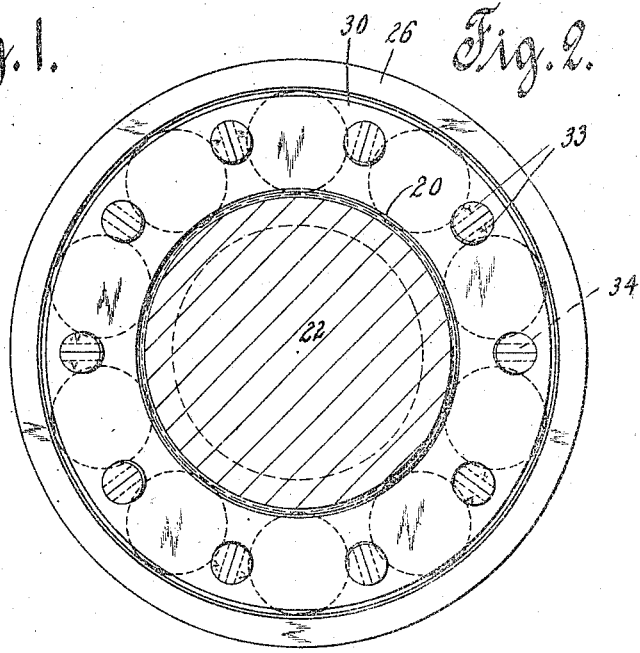
Figure 3:
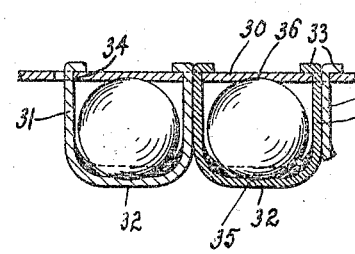
Figure 4:
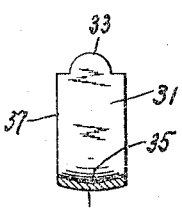
Figure 5:
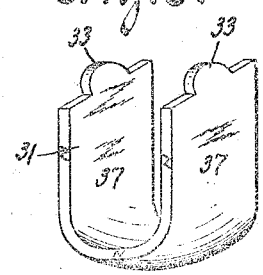
Figure 10:
Figure 11:

Figure 1 is a central vertical section taken through a ball bearing constructed in accordance with the present invention; Fig. 2 is a front elevation thereof; Fig. 3 is a section taken on line 3—3 of Fig. 1; Fig. 4 is a section taken through one of the separators; Fig. 5 is a perspective view of said separator; Fig. 6 is a vertical longitudinal section taken through a chuck used in grinding and polishing the outer bearing ring, the latter being in operative position thereon; Fig. 7 is a section taken on line 7—7 of Fig. 6; Fig. 8 is a vertical longitudinal section taken through a chuck for finishing the inner bearing ring, the latter being shown thereon in operative position; Fig. 9 is a section taken on line 9—9 of Fig. 8; Fig. 10 is a section taken through a modification of the chuck for holding the outer bearing ring; and Fig. 11 is a similar section taken through a modification of a chuck coöperating with the inner bearing ring.

Referring now more particularly to Figs. 1 to 5, inclusive, the numeral 20 indicates the inner bearing ring, having a bore 21, by which the said ring may be secured in any approved manner to an axle or shaft 22. The ring may rest against a shoulder 23 on the said axle or shaft, and is provided with a raceway 24, in alinement with the raceway 25 of an outer bearing ring 26. The ring 26 abuts against a shoulder 27 on a stationary part of the device, to which the ball bearing is applied, more particularly that side of the ring 26 is in abutment with the shoulder 27 which is opposite to that side of the ring 20 which rests against the shoulder 23 on the shaft. The raceway of the inner bearing ring is of the usual configuration, to wit: of curved cross section. The raceway of the ring 26, however, has in cross section a straight portion 28, which extends in parallel relation to the longitudinal axis of the shaft 22 from the deepest point (denoted in the drawings by the numeral 29) of its curved portion toward that side of the ring which is opposite to the side abutting against the shoulder 27.

The cage comprises a ring-shaped member 30, which is disposed transversely of and outside the raceways, and supports a plurality of spacing and retaining elements 31, each comprising a substantially U-shaped plate member, having its base 32 curved laterally so as to prevent the ball held thereby from leaving the cage in radial direction before the bearing is properly assembled. The ends of each U-shaped plate member are provided with lugs 33, by means of which the said retaining element is attached to the supporting ring 30. For this purpose the said supporting ring is provided with radial slots 34, in each of the same being seated two juxtaposed lugs 33 of two adjoining plate members 31, the said lugs being bent upon the outer face of the supporting ring, as clearly shown in Figs. 1 to 3, inclusive. The plate members 31 are made of comparatively soft material, for instance brass, and preferably formed by stamping. In the inner face of the base 32 of each plate member is formed a slight depression 35 and in alinement therewith is made in the supporting ring a similar depression 36. Each plate member loosely embraces a ball, such ball being seated in the registering depressions in the plate member and in the supporting ring. It is to be observed that the balls do not contact with the sides 37 of the plate members 31, but only with the depressions 35 in the bases thereof and with the depressions in the ring 30; friction between the balls, their retaining members and the supporting ring is, therefore, effectively prevented. The plate members 31 extend transversely of the raceways, and are disposed at an angle to the longitudinal axis of the shaft 22 in order to have the edges of their sides 37 disposed substantially equi-distantly from the raceways. This arrangement becomes necessary in view of the straight portion of one of the raceways. Obviously if the plate members were arranged parallel to the longitudinal axis of the shaft, their edges would not be disposed equidistantly from the raceways, and, therefore, co ld not support properly the bearing balls.

In the outer face of the inner bearing ring are formed two annular recesses, indicated at 38 and 39, said recesses extending from the sides of the ring toward the raceway, whereby shoulders 40 are formed on both sides of the raceway. In a similar manner are provided in the inner face of the outer bearing ring annular recesses 41 and 42 and shoulders 43. The purpose of this arrangement will be explained hereinafter.

From the foregoing it appears that the cage with the balls therein constitutes an assembled unit; its parts can be easily put together upon the inner bearing ring, and the outer bearing ring can be slid, after assembling, over the cage. Obviously, the assembling of the cage can thus be more easily effected than in the bearings heretofore in use, in which it had to be done in the raceways of the two bearing rings.

Each of the bearing rings can be conveniently finished, that is ground and polished, in two operations. The grinding and polishing of the outer bearing ring is illustrated in Figs. 6 and 7 of the drawings. For this purpose a chuck 44 is inserted into the recess 42 in said ring, an expansion member 45 holding the said ring properly upon the said chuck. A grinding wheel 46 serves to finish the outer face of the ring and the side 47 thereof, and a grinding wheel 48 the raceway of the same. After this operation the chuck is inserted into the recess 41 of the ring, and the grinding wheel 46 used to grind and polish the side 49 of the same. The inner bearing ring is mounted upon a chuck 50, (Figs. 8 and 9) that first engages the recess 39 therein, a compression member 51 assuring a proper gripping of the jaws of said chuck. A wheel 52 grinds and polishes the inner face of this ring and its side 53, and a wheel 54 the raceway of the same. The chuck is then engaged with the recess 38 in said ring, and the grinding wheel 52 used to finish the side 55 thereof.

In the device described above, the sides of the recesses in the bearing rings form part of a cylindrical surface. In the modification shown in Figs. 10 and 11 of the drawings the sides of the recesses are conical. The chucks must, therefore, be shaped correspondingly. By this construction a better grip on the rings is obtained with less work.

It is to be observed that, while herein the outer bearing ring has been disclosed as having a raceway provided with a straight portion and the inner ring a raceway having a curved cross section, this arrangement could be reversed without departing from the invention. In the appended claim the "extreme diameter" of the unit, that is to say of the assembled cage and balls therein, refers to either the largest or smallest diameter, or in other words to the outer or inner diameter.

What I claim is:—

In a ball bearing, the combination with two bearing rings having raceways, one of said raceways being of curved cross section and the other one having a curved portion and a straight portion running from the curved portion toward one of the sides of the respective rings, balls running in said raceways, a supporting ring disposed outside of said raceways, and a plurality of U-shaped ball retaining members embracing said balls and being attached to said supporting ring, said retaining members extending at an acute angle to the longitudinal axes of said bearing rings, said supporting ring, retaining members and balls forming a unit, and the diameter of said straight portion of one of the raceways being equal to one of the extreme diameters of the unit therein.

Signed at Springfield, in the county of Hampden and State of Massachusetts, this 23rd day of June, A. D. 1915.

FRANK STARIN.

Witnesses:
 WINFIELD S. LEE,
 LADISLAUS MARKUS.